United States Patent [19]

Kristofich et al.

[11] Patent Number: 5,168,798
[45] Date of Patent: Dec. 8, 1992

[54] ROTISSERIE

[75] Inventors: John F. Kristofich, Washington Township, Bergen County; Robert J. Kristofich, Paramus, both of N.J.

[73] Assignee: Kristline Corporation, Rochelle Park, N.J.

[21] Appl. No.: 764,440

[22] Filed: Sep. 24, 1991

Related U.S. Application Data

[63] Continuation-in-part of Ser. No. 670,978, Mar. 18, 1991.

[51] Int. Cl.$^5$ .............................................. A47J 37/04
[52] U.S. Cl. ................................. 99/421 H; 99/419; 99/421 R; 99/421 A
[58] Field of Search ........................... 99/419–421 V, 99/494, 532, 533; 126/25 R, 9 R; 211/60.1, 70.1

[56] References Cited

U.S. PATENT DOCUMENTS

| | | | |
|---|---|---|---|
| 902,724 | 11/1908 | Giovanna | 99/421 HV |
| 2,485,890 | 10/1949 | Keljik | 99/421 |
| 2,577,953 | 12/1951 | Hagopian | 126/25 |
| 2,791,959 | 5/1957 | Pirz | 99/421 |
| 2,939,384 | 6/1960 | Vinson | 99/421 |
| 3,169,470 | 2/1965 | Oatley | 99/421 |
| 3,190,211 | 6/1965 | Ticoian | 99/421 |
| 3,297,166 | 1/1967 | Summers | 211/60 |
| 3,309,982 | 3/1967 | Surks | 99/420 |
| 3,331,308 | 7/1967 | Hoffert | 99/340 |
| 3,375,816 | 4/1968 | Chestnut, Jr. | 126/25 R |
| 3,393,630 | 7/1968 | Pickens | 99/259 |
| 3,428,039 | 2/1969 | Desmoulins | 126/9 R |
| 3,442,202 | 5/1969 | Ishida | 99/421 |
| 3,530,530 | 9/1970 | Byrnes, Sr. | 17/1 |
| 3,848,523 | 11/1974 | Galisz et al. | 99/420 |
| 3,858,495 | 1/1975 | Gotwalt | 99/421 H |
| 3,866,527 | 2/1975 | Katris | 99/421 H |
| 4,112,832 | 9/1978 | Severdia et al. | 99/421 HV |
| 4,154,154 | 5/1979 | Vivian | 99/421 H |
| 4,158,991 | 6/1979 | Nakashima | 99/421 H |
| 4,363,313 | 12/1982 | Smith | 126/9 R |
| 4,492,215 | 1/1985 | DiGianvittorio | 126/25 R |
| 4,598,690 | 7/1986 | Hsu | 126/9 R |
| 5,001,971 | 3/1991 | Beller | 99/419 |
| 5,058,493 | 10/1991 | Basek et al. | 99/421 H |

FOREIGN PATENT DOCUMENTS 1409366  7/1965  France .............................. 99/419

Primary Examiner—Timothy F. Simone
Attorney, Agent, or Firm—Darby & Darby

[57] ABSTRACT

A portable rotisserie is disclosed which can be readily assembled and disassembled. The rotisserie includes front and back walls and two side walls each of which includes at its extremities complementary connecting means so that the walls can be assembled in the form of a rectangular frame. The front wall includes two plates between which are mounted a plurality of engaging idler gears and a drive gear for rotating the idler gears. Notches are provided in the upper surface of the plates of the front wall for receiving a sprocket gear attached to a skewer, the other end of which is supported in the back wall. A drive gear engages the idler gear so that when it is rotated, either manually or by motor, rotation of the idler gears causes the skewers mounted in the notches to rotate.

16 Claims, 7 Drawing Sheets

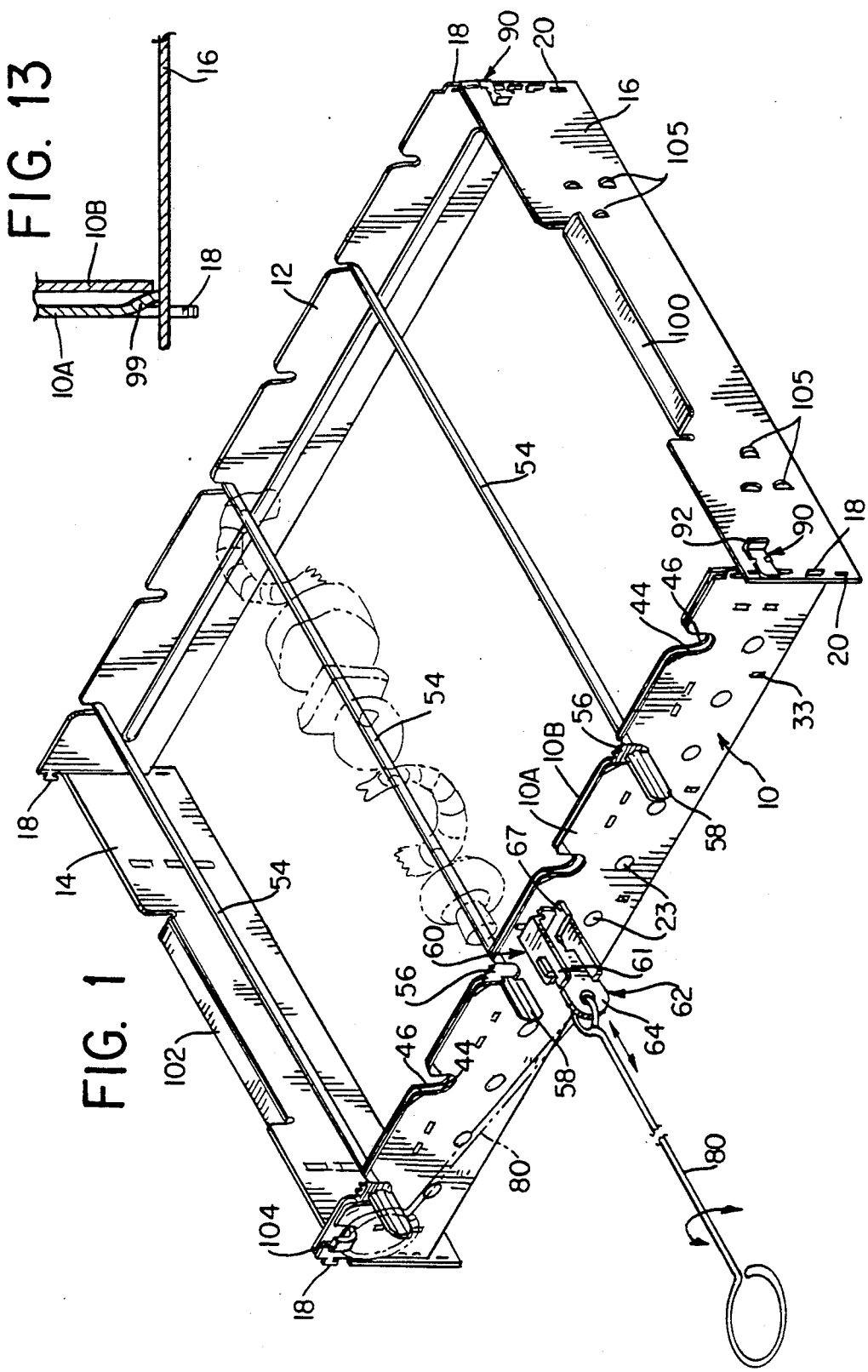

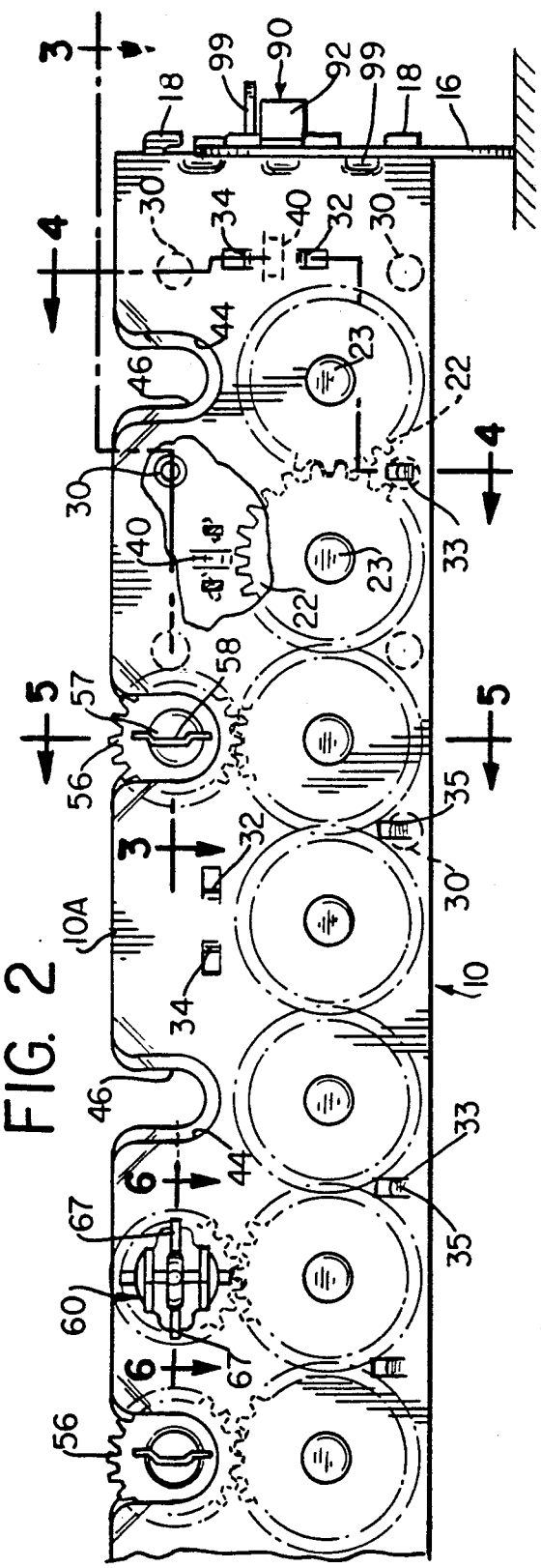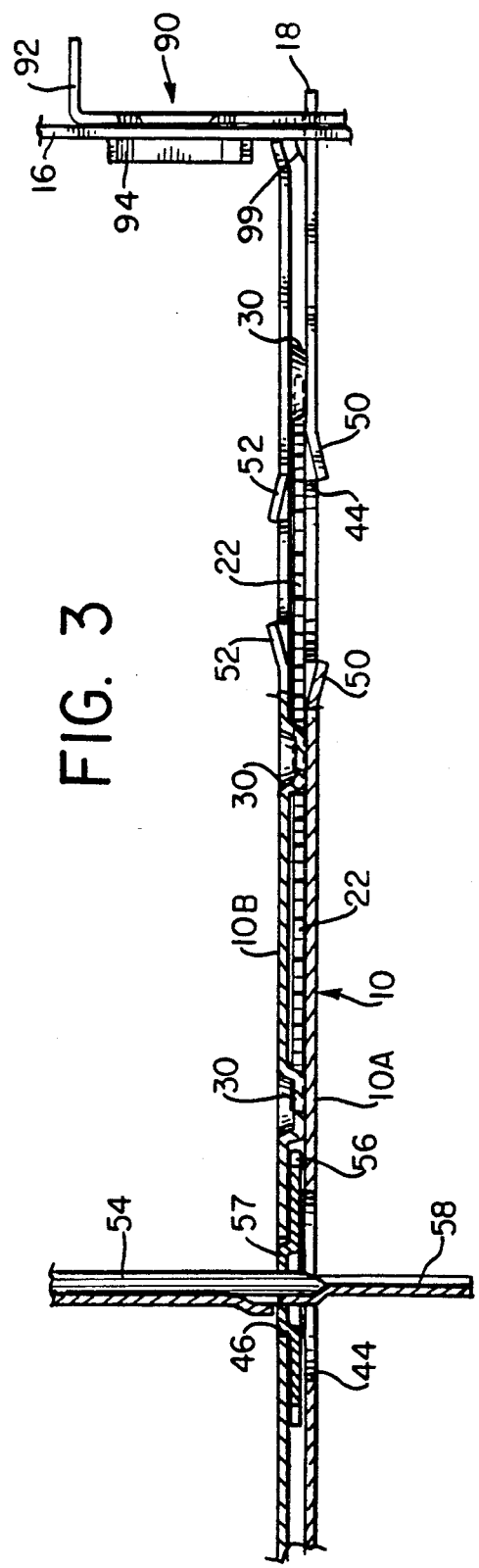

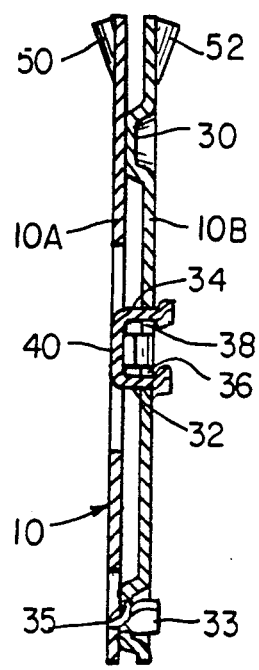
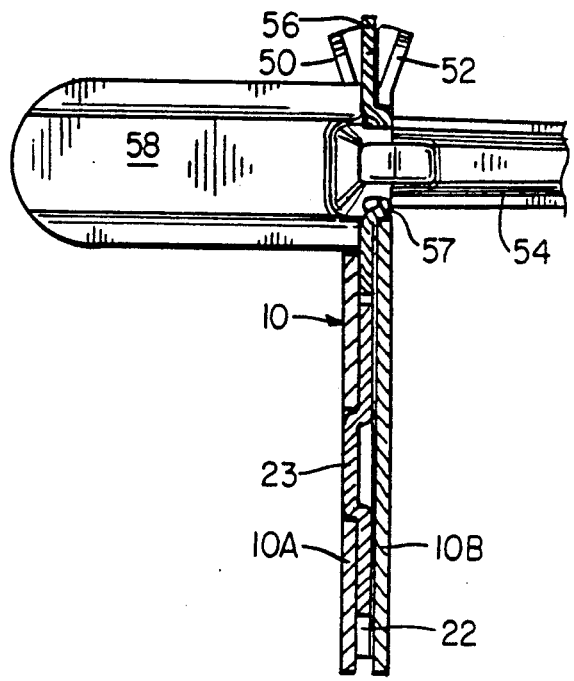
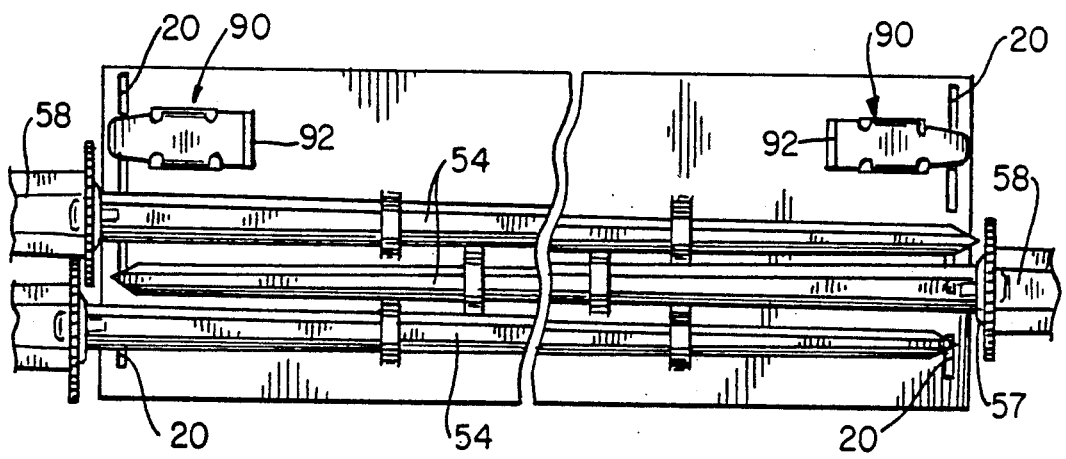

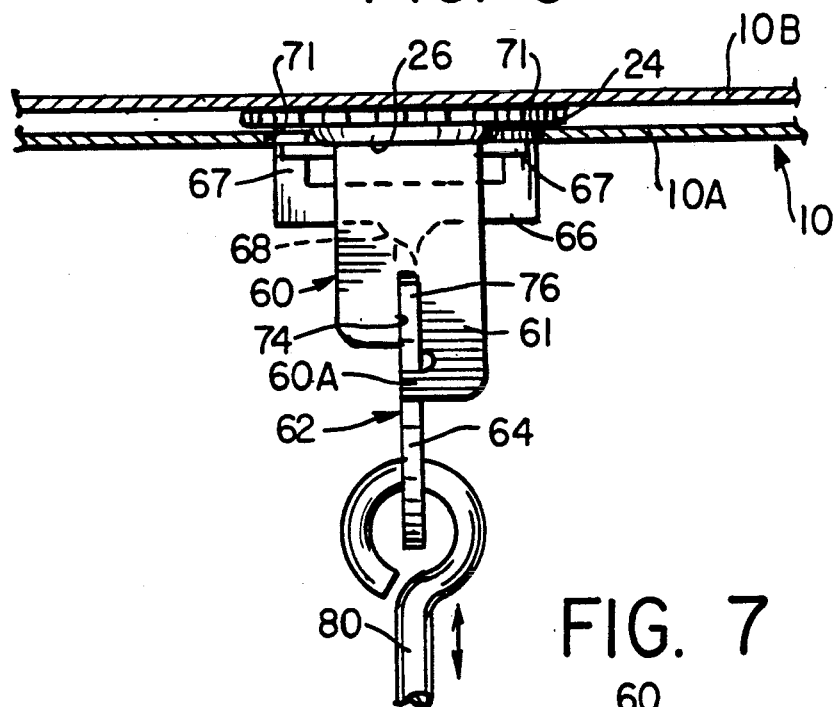
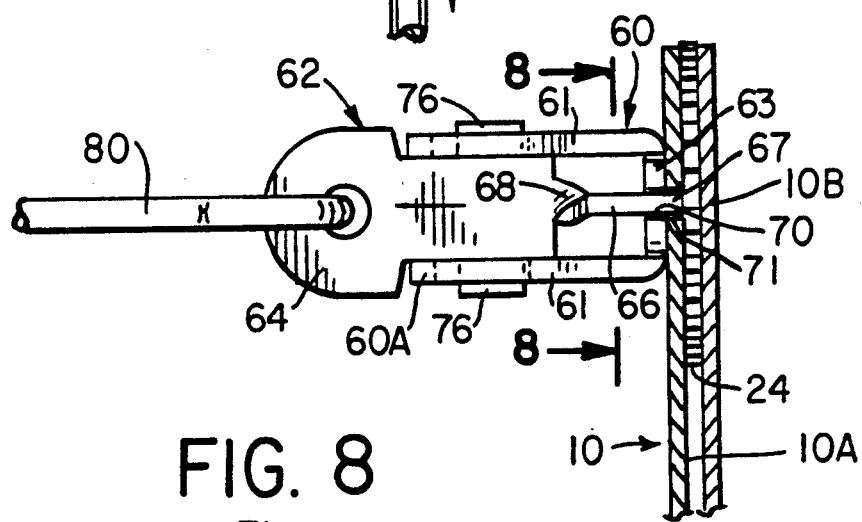
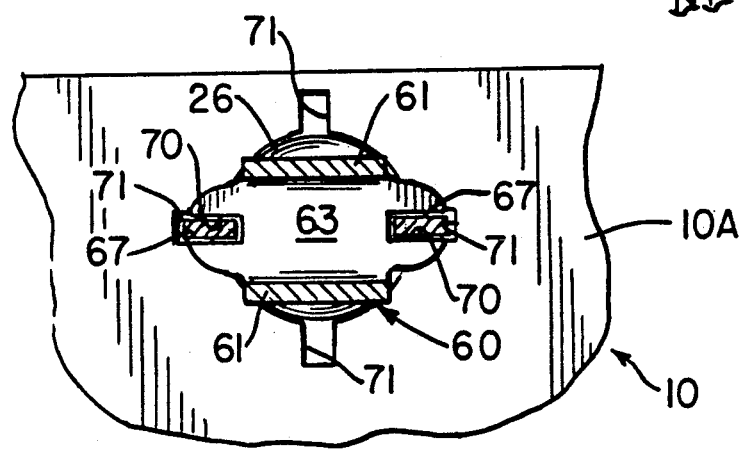

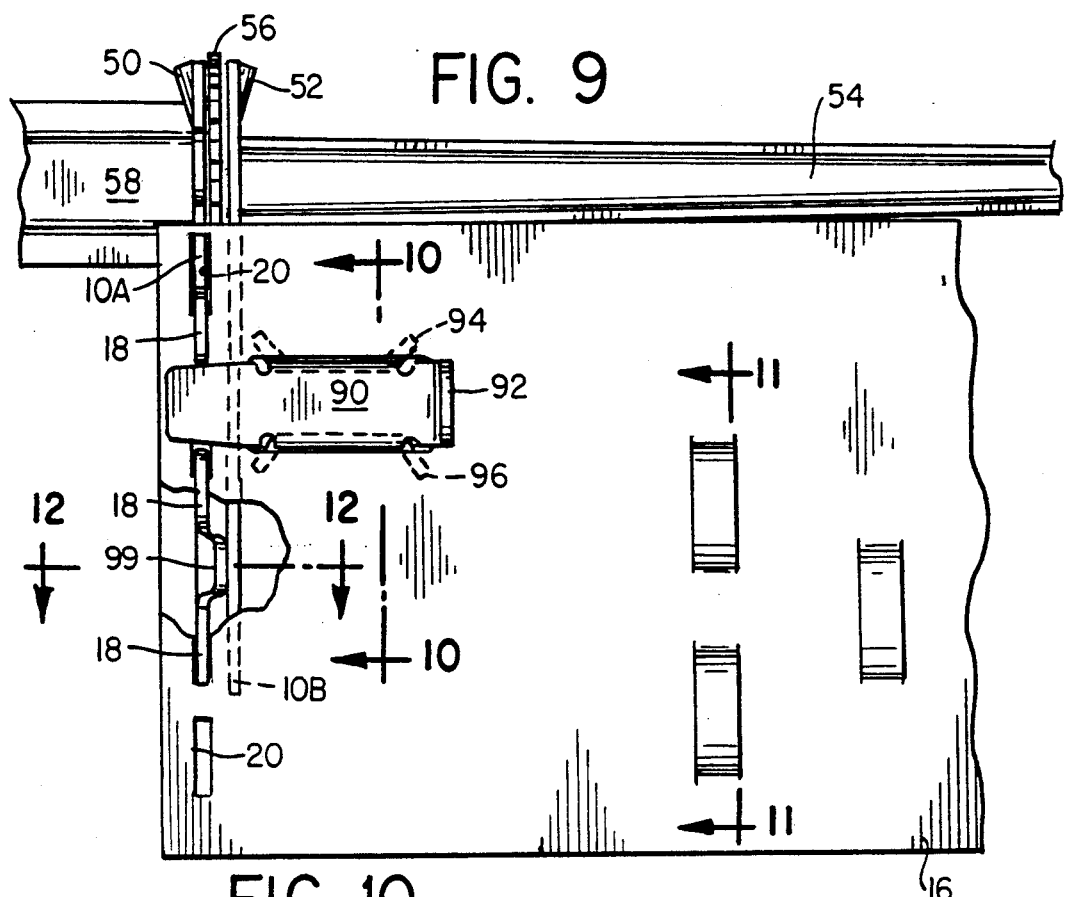
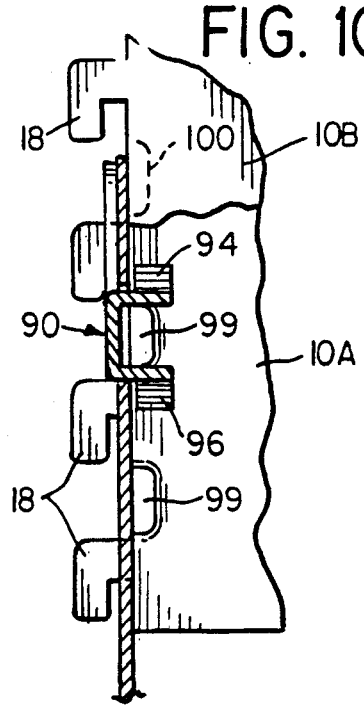
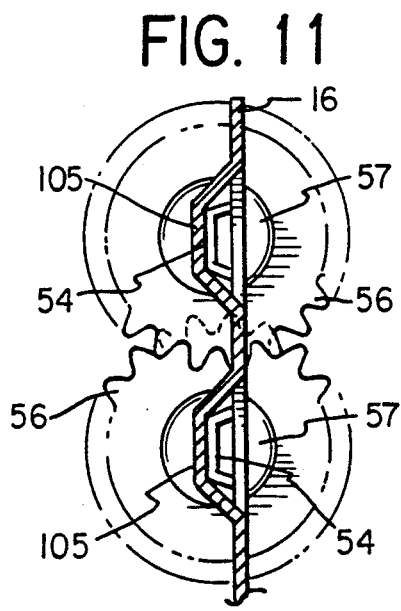

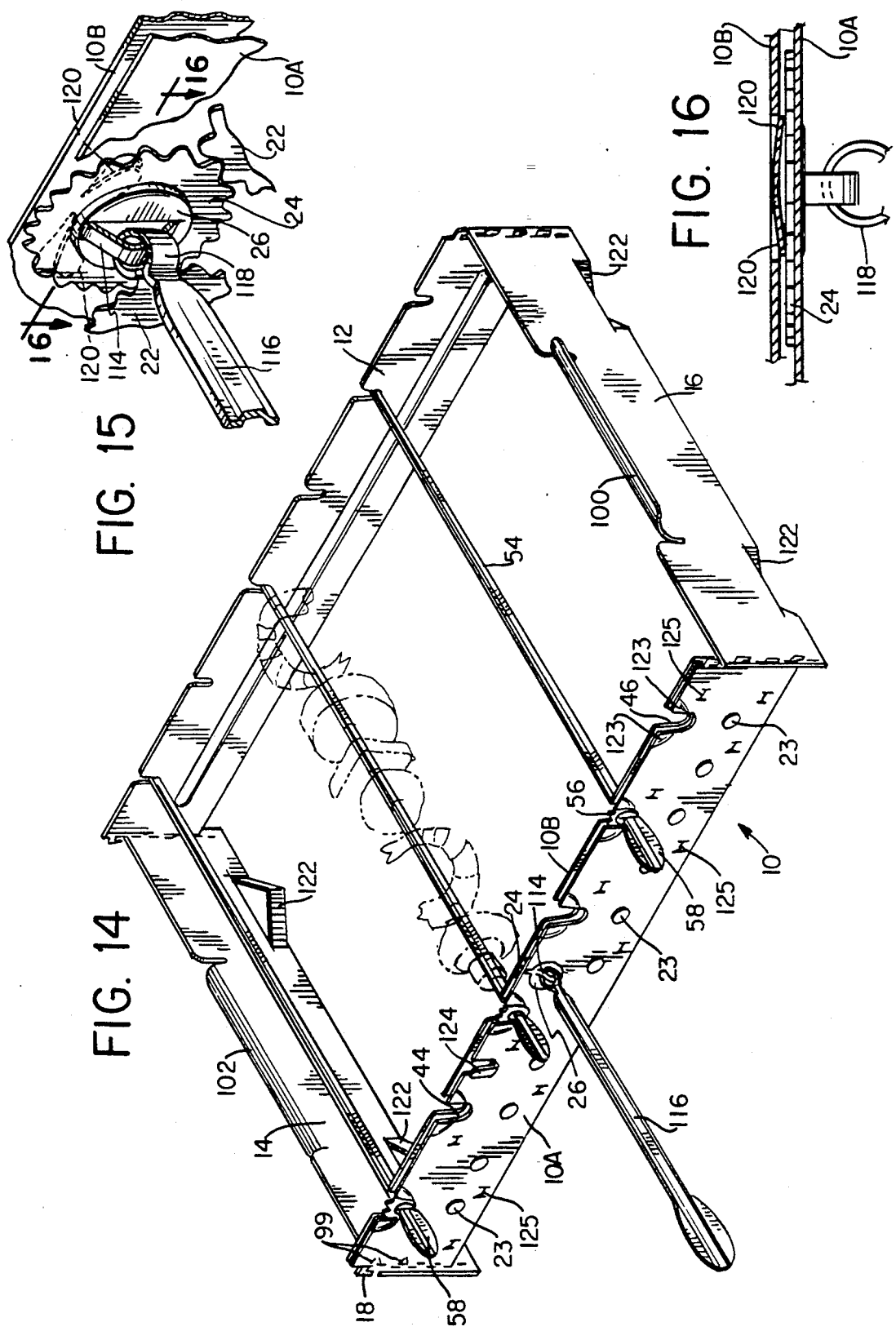

ROTISSERIE

This is a continuation-in-part of U.S. patent application Ser. No. 07/670,978 filed Mar. 18, 1991 in the name of John F. Kristofich et al and entitled Rotisserie.

This invention relates to a rotisserie for rotating a plurality of skewers. More particularly, this invention relates to a portable rotisserie adapted to be placed on outdoor and/or indoor grills which can be easily assembled and disassembled for storage and/or shipment.

Rotisseries capable of supporting a number of skewers for use with indoor and outdoor grills are well-known. Such devices usually incorporate a drive means capable of rotating all of the skewers, typically under the control of an electric motor.

The present invention provides a rotisserie of this general type which is extremely easy to assemble and/or disassemble for storage and/or shipment. A rotisserie in accordance with the invention includes a number of features which make the rotisserie particularly useful as a portable device yet it is sturdy and solid in operation and includes a mechanism for adjusting the height of the skewers with respect to the fire.

SUMMARY OF THE INVENTION

In accordance with the invention, a portable rotisserie comprises front, back and side walls. The walls include ears which engage appropriate slots in a contiguous wall so that the four walls can be locked together quickly with very little effort. The front wall preferably includes a multiplicity of engaged idler gears which can be driven by a single drive gear when a shaft connected to the drive gear is rotated manually or by an electric motor. Slots are provided in the front wall so that skewers containing a sprocket can be supported in the front and back walls with the skewer sprocket engaging one of the idler gears.

THE DRAWINGS

FIG. 1 is a perspective view showing an assembled rotisserie in accordance with the invention;

FIG. 2 is a front elevational view showing the front wall of the rotisserie.

FIG. 3 is a top plan sectional view along the line 3—3 of FIG. 2;

FIG. 4 is a side sectional view along the line 4—4 of FIG. 2;

FIG. 5 is a side sectional view along the line 5—5 of FIG. 2;

FIG. 6 is a sectional view along the line 6—6 of FIG. 2;

FIG. 7 is a sectional view similar to FIG. 6 with the drive gear and attached handle turned 90°;

FIG. 8 is a sectional view along the line 8—8 of FIG. 7.

FIG. 9 is a side elevational view of one of the side walls showing the mechanism for interconnecting the front and side walls;

FIG. 10 is a sectional view along the line 10—10 of FIG. 9;

FIG. 11 is a sectional view along the line 11—11 of FIG. 9;

FIG. 12 is a sectional view along the line 12—12 of FIG. 9; and

FIG. 13 is an elevational view broken away showing one of the side walls with three skewers mounted on the wall.

FIG. 14 is a perspective view of an embodiment of the invention with various improvements as described below;

FIG. 15 is a perspective view partially broken away showing the drive gear and attached handle of the embodiment shown in FIG. 14;

FIG. 16 is a sectional view along the line 16—16 of FIG. 15;

DETAILED DESCRIPTION

Figure 17:
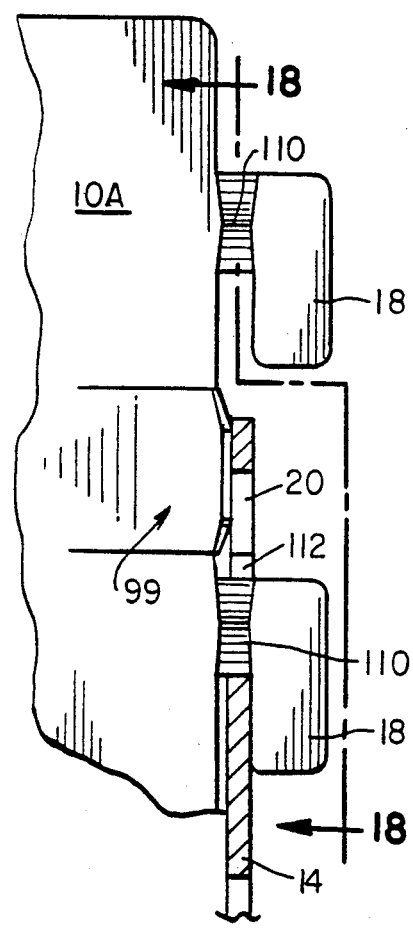
FIG. 17 is a side plan view partially in cross section showing a preferred means for securing the walls together.

Referring initially to FIG. 1, a portable rotisserie in accordance with the invention comprises a front wall 10, a back wall 12 and side walls 14 and 16. As shown in FIG. 3, the front wall 10 comprises two spaced apart plates 10A and 10B. The outer plate 10A and the back wall 12 include four laterally extending L-shaped ears 18 at each end which are adapted to fit into complementary slots 20 in the ends of the side walls 14 and 16 (see FIGS. 9 and 10). In the preferred embodiment, there are four L-shaped ears 18 extending from each end of the plate 10A and wall 12 and four complementary slots 20 at each end of the side walls 14 and 16.

To assemble the rotisserie, the L-shaped ears 18 are inserted into the slots 20 so that the ears engage and lock with the side walls 14 and 16. The side walls 14 and 16 will rest on top of the grill (or other cooking device) and the height of the rotisserie can be adjusted by selecting the slots 20 into which the ears 18 are inserted.

The two plates 10A and 10B which constitute the front wall 10 support a number of toothed idler gears 22 each of which may be formed to include an integral pressed hub 23 (see FIG. 5) which is received for rotation within an appropriate opening (not numbered) in the outer plate 10A. A drive gear 24 including a similarly shaped hub 26 (FIG. 6) is supported toward the upper surface of the outer plate 10A (see FIG. 2) and engages one of the idler gears 22 so that rotation of the drive gear 24 will cause all of the idler gears 22 to rotate.

The innermost plate 10B is formed with a multiplicity of pressed dimples 30 which space the plates 10A and 10B apart sufficiently to support the idler gears 22. For example, upper and lower rows of twelve dimples each may be provided to maintain proper spacing between the plates 10A and 10B so that the idler gears 22 can rotate freely under the influence of the drive gear 24.

To hold the two plates 10A and 10B together, connecting means comprising six pairs of tabs 32 and 34 may be punched from plate 10A so that they extend toward the plate 10B. Plate 10B includes complementary holes 36 and 38, respectively, so that the tabs 32 and 34 can be pushed through the apertures and twisted to secure the plates 10A and 10B together. Two projections 40 (only one of which is shown in FIG. 2) may be formed in the plate 10B at opposite ends of the plate between two of the holes 36 and 38 to help maintain proper spacing. The connecting means also comprises six small grips 35 punched from the outer plate 10A in registry with six of the lower dimples 30 which include apertures through which the grips 35 pass. To secure the panels together, the grips are simply twisted.

A series of notches 44 (for example six) are formed in the upper surface of the plate 10A and a like series of slightly smaller notches 46 formed in the upper surface of plate 10B. As shown in FIG. 3 at 50 and 52, the corners of the plates 10A and 10B which define the notches 44 and 46 may be bent outwardly to facilitate receipt of a skewer sprocket within the notches as will become apparent from the following description.

Each of the skewers may be identical and comprises a slightly tapered spear 54 approximately U-shaped in cross-section (see FIG. 11), a sprocket 56 adapted to engage the idler gears 22 and a handle portion 58. In the preferred embodiment, the handle 58 and spear 54 are integrally formed. The sprocket 56 is a separate member which is formed with a hub 57 and slid over the spear 54 and over a small projection 59 (FIG. 5) so that it is retained in its desired position between the handle 58 and projection 59. The non-symmetrical shape of the spear 54 prevents rotation of the sprocket 56 relative to the skewer. The spear 54, of course, is used to penetrate and hold the food to be grill as shown in phantom lines in FIG. 1. The radius of hub 57 approximates the radius of notch 46 so that the skewer is effectively journalled in the notch for smooth station.

When the rotissiere is in operation, it may be desirable to position the individual skewers and let them remain in that position for a short period of time. If the skewers are not balanced, the weight of the food on the skewers can cause rotation of the skewers from the desired position. Accordingly, the invention further provides a means for preventing unintended rotation of the skewers. The details of this locking mechanism are shown in FIGS. 6, 7 and 8.

A U-shaped bracket 60 is welded or otherwise attached to the hub 26 of drive gear 24. Bracket 60 includes parallel legs 61 extending from a base 63. A reciprocal connector 62 is received within the opposing legs 61 of bracket 60 for short movement toward and away from the front wall 10. Connector 62 includes a head 64 and a transverse pronged stem 66, the plane of which is at right angles with respect to the plane of the head 64. Head 64 and pronged stem 66 are joined by twisted portion 68, the connector 62 being stamped and twisted into the configuration shown in the drawings. The pronged stem 66 terminates in prongs 67 which pass through slots 70 in bracket base 63 and into engagement with two of four complementary slots 71 within plate 10A of front wall 10 (FIG. 8).

As shown in FIG. 6, each bracket leg 61 is bifurcated to form a track 74. The head 64 of connector 62 includes oppositely extending tabs 76 which ride in the tracks 74. The outermost extremity 60A of the bracket 61 extends over the track so that the tabs 76 cannot be removed from the tracks during normal operation.

A handle 80 is hooked through an aperture (not numbered) in the head 64 of connector 62 so that the connector 62 can be turned to rotate the skewers. The handle also serves to reciprocate the connector 62 to lock the skewers in place to prevent turning as mentioned above. For example, assuming four locking slots 71 (FIG. 8) are provided in plate 10A, if it is desired to lock the skewers in one of the four available positions, the handle 80 may be rotated until the prongs 67 on the connector 62 are aligned with two of the slots 71. The handle 80 is then pushed causing the prongs 67 to move into the retention slots 71 in which position the skewers are held securely regardless of any misbalance that may occur because of the weight of the food on the various skewers. Thereafter, if it is desired to reposition the skewers, handle 80 is pulled removing prongs 67 from slots 71 with tabs 76 at approximately their outermost position within the tracks 74. Under these circumstances, the prongs 67 rest in the slots 70 of the bracket base 63 which, because it is attached to the hub 26 of drive wheel 24, rotates with the skewers. Hence, in this position the skewers can be rotated manually or by electric motor.

In order to maintain the walls in their desired positions after the rotissiere has been assembled, each of the side walls 14 and 16 include locking means at their opposite extremities (see FIG. 9). Each of the locking means is identical and comprises a slide 90 having a finger grip 92 on the outer surface of the side wall and a pair of C-shaped slides 94 and 96 on the inner surface of the side wall. The slides are movable in tracks (not numbered) which are stamped into the side walls. After the walls have been assembled (with the lock in its retracted position) the finger grip 92 is pushed forwardly causing the slide 90 to move between a pair of adjacent gears 18, in which position the walls cannot be disassembled. For disassembly, of course, the locking means are simply retracted.

The invention is made of relatively inexpensive stamped metal parts which lends itself to a number of convenient features. For example, the sidewalls 14 and 16 may include punched out retention strips 98 (See FIGS. 9 and 11) which can be used to hold the skewers 54 when the rotisserie is disassembled (FIG. 12). At each of the plate 10A and rear wall 12 offsets 99 are formed between the mounting ears 18. These offsets, as shown in FIG. 13, are adapted to contact the contiguous side wall so that when the entire device is assembled, the offsets 99 bias the contiguous walls apart, causing a small amount of tension to be applied to each of the walls when the rotisserie is assembled. This force tends to reduce any "play" in the assembled structure and increases its rigidity. The walls 14 and 16 may include upper transverse sections 102 and 100, respectively, bent outwardly to serve as handles for the assembled rotisserie. A hook 104 may be provided in the outer plate 10A to support handle 80 during shipment. Strips 105, shaped as trapezoids (see FIG. 11) may be punched from side walls 14 and 16 to serve as retaining means for the skewers 54 during transport and storage (see FIG. 12). An advantage of the illustrated construction is that when disassembled, the parts lay relatively flat and can be packaged conveniently in a relatively small and stackable box or carton.

FIGS. 14-20 illustrate a commercial embodiment of the invention incorporating certain improvements which tend to reduce the cost of manufacture and improve the operation of the device. In describing the embodiment of FIGS. 14-20, those parts which are essentially identical to parts described with reference to FIGS. 1-13 are identified by the identical numeral. Since the two embodiments are very much alike, only the modifications of the second embodiment are described below.

Figure 18:
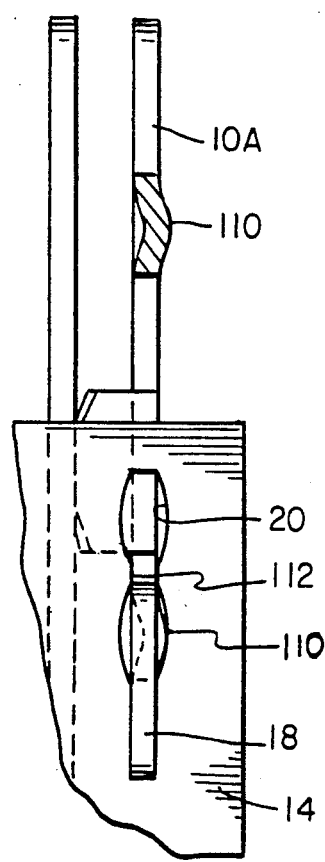
FIG. 18 is a sectional view along the line 18—18 of FIG. 17.

In the first place, the means for securing and locking the walls of the grill together have been modified so that no movable parts are required. Thus, as shown in FIGS. 17 and 18, each of the L-shaped ears 18 on the edges of outer plate 10A and back wall 12 includes a neck portion 110 which is curved in cross section so that it extends slightly out of the plane of the ear 18. Each of the slots 20 in the side walls 14 and 16 which receive the ears 18 is shaped generally in the form of an hourglass with a constricted or waist portion 112 at the center of the slot 20. Because of the hourglass shape of the slot 20, the curved neck 110 of each ear 18 can be inserted into the enlarged upper portion of the hourglass slot 20. When pressure is applied to the wall, the neck 110 is forced past the waist 112 and into the lower portion of the hourglass shaped slot.20 as shown at the bottom of FIGS. 17 and 18. In this position, the walls are effectively locked together since the expanded or curved neck 110 will not pass the waist 112 unless a substantial force is applied. This effectively prevents accidental disconnection of the adjacent walls without the use of movable locking means as shown, for example, in FIG. 9.

Furthermore, as indicated above it is typically desirable to rotate the skewers to a particular position and leave the skewers in that position for a period of time while the food on the skewers is being cooked. Very often the weight of the food on the skewers will tend to cause the skewers to rotate from the desired position and, therefore, precautions should be taken to prevent unintended rotation of the skewers. In the embodiment shown in FIGS. 1-3 it is possible to lock the driving gear (and thereby the skewers) into any one of four positions. In the embodiment shown in FIGS. 14-19, a simpler retention means is employed wherein it is possible to hold the skewers in any desired angular position. This construction is shown in FIGS. 14, 15 and 16.

As shown most clearly in FIG. 15 the hub 26 of drive gear 24 includes an integral stamped loop 114 which is attached to a handle 116 by means of a hook 118. Hook 118 is integrally formed with the handle 116 and is curved around and through loop 114 after the parts are assembled to form a "permanent" connection. To prevent unintended rotation of the skewers, the inner plate 10B is provided with two stamped tabs 120 which, as shown in FIG. 16 frictionally engage the inner surface of the drive gear 24. Of course, the frictional engagement should not be such as to significantly hinder rotation of the drive gear but it is relatively easy to provide sufficient friction to prevent unintended rotation of the skewer under normal conditions while still providing relatively easy rotation of the gears and skewers.

Also, as shown in FIG. 14, in this embodiment of the invention, the sidewalls 14 and 16 may include stamped support ribs 122 at their bottom surfaces to provide a more solid foundation for the supporting walls of the rotisserie when it is placed on a grill, particularly if the bars of the grill are parallel to the side walls of the rotisserie.

Figure 19:
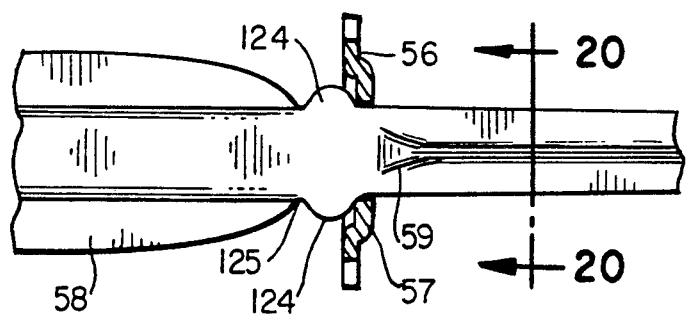
FIG. 19 is a side plan view partially in section showing the skewers as used in the embodiment of FIG. 14.
Figure 20:
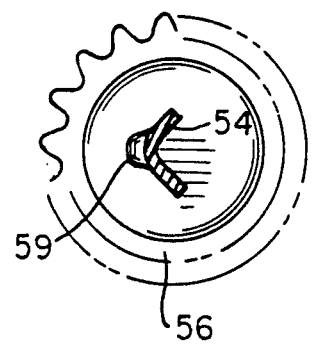
FIG. 20 is a sectional view along the line 20—20 of FIG. 19.

In the commercial embodiment, the skewers are shaped slightly differently. The spears 54, as shown in FIGS. 19 and 20, are V-shaped in cross section. The handle 58 is oval shaped and includes projections 124 to maintain the sprocket in place between projection 124 and projection 59.

In this second embodiment, the outer plate 10A includes pockets 123 enveloping the upper slots 44 to facilitate acceptance and retention of the sprocket gears 56. A hook 124 may be provided to receive the handle 116 for storage and shipment. In the preferred embodiment, all of the parts are made of stainless steel and the individual parts can be formed in a single stamping operation. The outer and inner plates 10A and 10B may be secured together mechanically by stamping a plurality of tabs 125 in one plate (for example, the outer plate 10A) which can be inserted into complementary openings in dimples 30 (not shown in FIG. 14) formed in the opposite plate (10B). The tabs can then be twisted to secure the plates together.

Certain features of the invention have utility with a rotisserie which does not include the interlocking gears for rotating the skewers. In particular, it is contemplated that the means for fastening the walls may be used in conjunction with a grill or rotisserie in which each of the skewers must be separately rotated. In such a construction, the skewer shown in FIG. 19 is useful because it includes notches 125 between handle 58 and bulge 124 which can frictionally engage a suitably shaped notch in the front wall of the rotisserie to hold the skewer in a position where it will not rotate under the weight of the food on the skewer.

What is claimed is:

1. A portable rotisserie for supporting and rotating a plurality of skewers, comprising:
   a front wall,
   a back wall, and
   two side walls, said side walls adapted to rest on a supporting surface,
   each of said walls including attachment means for ready assembly and disassembly of said walls, said attachment means comprising outwardly projecting ears in one wall and complementary slots in a contiguous wall,
   said front wall including a plurality of longitudinally aligned, engaging idler gears and a drive gear for rotating said idler gears, and a plurality of notches in the upper edge of said front wall, each said notch adapted to receive a skewer having a sprocket such that the sprocket engages one of said idler gears.

2. A portable rotisserie according to claim 1, wherein said attachment means comprises two or more slots at the ends of two opposite walls.

3. A portable rotisserie according to claim 1, wherein said front wall comprises two spaced apart plates.

4. A portable rotisserie according to claim 3, wherein said idler gears are journalled in one of said plates.

5. A portable rotisserie according to claim 4, wherein said attachment means comprises at least two ears extending laterally from each of the opposite edges of one of said plates and said back wall.

6. A portable rotisserie according to claim 4, further including slidable locks on said side walls for locking said attachment means.

7. A portable rotisserie according to claim 1, wherein said ears include a neck portion which extends out of the plane of the ear and wherein said slots includes a narrow section for retaining said neck portion.

8. A portable rotisserie according to claim 4, wherein the notches in the innermost plate are adapted to rotatably support a hub on one side of a skewer sprocket.

9. A portable rotisserie according to claim 1, including means for holding said drive gear in at least one preselected position.

10. A portable rotisserie according to claim 9, wherein said means for holding said drive gear in at least one preselected position comprises means for causing a frictional engagement between said drive gear and said front wall.

11. A portable rotisserie for supporting and rotating a plurality of skewers, comprising:
   a front wall comprising two spaced apart plates, a back wall, and two side walls, said side walls adapted to rest on a supporting surface, each of said walls including attachment means for ready assembly and disassembly of said walls, said attachment means comprising at least two outwardly projecting ears in one wall and at least two complementary slots in a contiguous wall, said front wall including a plurality of longitudinally aligned, engaging idler gears and a drive gear for rotating said idler gears, and a plurality of notches in the upper edge of said front wall, each said notch adapted to receive a skewer having a sprocket such that the sprocket engages one of said idler gears.

12. A portable rotissiere according to claim 11, further including locking means for preventing accidental dissasembly of said walls.

13. A portable rotisserie according to claim 12, wherein said locking means includes slidable locks on said side walls for locking said attachment means.

14. A portable rotisserie according to claim 12, wherein said locking means includes neck portions on said ears, said neck portions extending out of the planes of said ears, and wherein each of said slots includes a narrow section for retaining said neck portion.

15. A portable rotisserie according to claim 11, wherein the notches in the innermost plate are adapted to rotatably support a hub on one side of a skewer sprocket.

16. A portable rotisserie according to claim 11, including means for holding said drive gear in at least one preselected position.

* * * * *